United States Patent Office 2,970,134
Patented Jan. 31, 1961

2,970,134

DIENE POLYMERIZATION

William S. Anderson, Berkeley, Calif., assignor to Shell Oil Company, a corporation of Delaware No Drawing. Filed Nov. 18, 1957, Ser. No. 696,942

12 Claims. (Cl. 260—94.3)

This invention relates to improvements in the processes for the production of polymers of conjugated dienes. More particularly it relates to improved processes for the polymerization of conjugated dienes whereby the polymer obtained is characterized by a high proportion of the cis 1,4-addition product.

It has been reported that conjugated dienes may be polymerized at low temperatures and pressures by conducting the polymerization in the presence of certain catalysts which will afford a polymer having a high cis 1,4-configuration. The catalysts which will afford the high cis 1,4-configuration are broadly termed "low pressure" catalysts and are prepared from two compounds one of which is a hydride or organic compound of aluminum, gallium, indium, thallium, or the like, and the other compound being a halide of a transition metal of groups IV–VI of the periodic table. Typical compounds in this first group include aluminum triethyl, aluminum diethyl halide, aluminum hydride, indium trimethyl and the like. Representative compounds of the second compound are represented by, for example, titanium trichloride, titanium tetrachloride, zirconium iodide, and the like. In addition to these compounds a great number of other compounds of similar types have been described as being similarly suitable for the polymerization of conjugated dienes. As a practical matter it is now well established that the polymerization of conjugated dienes is feasible with only a rather limited number of the low pressure catalysts. This is so because a great many of the low pressure catalysts, which have been described as being suitable for polymerization of conjugated dienes to produce polymer having a high cis 1,4-configuration, will not, in fact, produce the desired polymer in either a sufficiently high amount or within a reasonable time. This latter factor is a limitation to the commercialization of the low pressure methods for the polymerization of conjugated dienes. On the other hand the few low pressure catalysts which will afford suitable reaction rates and a polymer having a high cis 1,4-content have numerous practical disadvantages which this invention helps to overcome. One of the most suitable types of catalysts for low pressure polymerizations of conjugated dienes is represented by, for example, that which is prepared from an aluminum trialkyl or aluminum dialkyl halides and titanium trichloride or tetrachloride. However, such catalysts will not produce, in short times, polymer which has both a high content of cis 1,4-addition product and a high molecular weight.

It is an object of this invention to provide improved processes for the polymerization of conjugated dienes by the low pressure processes. Specifically, it is an object of this invention to provide improved processes for the polymerization of conjugated dienes by the low pressure processes whereby the polymer has a higher content of the cis 1,4-addition product. It is a further object of this invention to provide improved processes for the polymerization of conjugated dienes, particularly butadiene and isoprene, whereby a higher cis 1,4-addition product is obtained. Other objects will become apparent as the description of the invention proceeds.

These and other objects are accomplished in the process for the polymerization of conjugated diene at low temperatures and pressures, the polymerization being conducted in the presence of the low pressure catalysts, by the improvement which comprises conducting the polymerization in the presence of an added portion of a metal hydroxide or basic metal salt. By the presence of the added base during the course of polymerization it will be found that the polymer will have a higher cis 1,4-content without any substantial sacrifice in either the molecular weight of the polymer or the rate of the polymerization. The improved processes of this invention will be found to increase the proportion of cis 1,4-addition product irrespective of the specific low pressure catalyst employed. Thus, for example, if the catalyst is of the type capable of producing in the order of 60–80% cis 1,4-polybutadiene from butadiene it will be found that the addition of the base will increase the percentage of the cis 1,4-addition product in the order of 10–35%. It is a major advantage of the present invention that substantial increases in the proportion of cis 1,4-product are obtained when those catalysts are employed which heretofore produced substantially lower yields of the cis 1,4-polymerization product, i.e., in the order of about 30% in which event the percentage is raised in the order of about 50 to 80% and sometimes even higher.

As previously indicated the improvements of the present invention are not limited by any particular low pressure catalyst system and accordingly any low pressure catalyst may be employed such as those described in Belgian Patent No. 551,851 or Belgian Patent No. 543,292, which catalysts are incorporated herein by reference. The present invention is particularly suitable for certain low pressure catalysts because the greatest advantages are obtained thereby. In the preferred embodiment the improvements of the present invention are directed to the polymerization of conjugated dienes employing low pressure catalysts prepared from aluminum alkyls and metal halides wherein the metal is selected from a transition metal of groups IV, V, VI and VIII of the periodic table. Another group of low pressure catalysts which are particularly suitable for the purposes of this invention consists essentially of nitrates or halides of divalent cobalt or nickel. These latter catalysts are described in greater detail in copending application Serial No. 696,924, filed November 18, 1957, which is also incorporated here by reference. Among the low pressure catalysts systems which are derived from the two components there may be mentioned the catalysts formed from A or B as follows:

A. The reaction product of (1) a compound of metal selected from groups IV, V, VI and VIII of the Mendeleeff Periodic Table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan thiophenol, carboxylic acid and sulfonic acid, B. The reaction product of (1) a compound of a metal from groups IV, V, VI and VIII of the Mendeleeff Periodic Table and manganese with (2) a compound selected from the group consisting of aluminum trialkyl, magnesium alkyl, zinc alkyl and Grignard compound.

The quantity of the base which is required in order to increase the proportion of the cis 1,4-addition product will vary depending upon the particular catalyst system employed. When the catalyst system is capable of producing a polymer of the conjugated diene having a high proportion of the cis 1,4-addition product without the use of the added metal hydroxide, i.e., in the order of 90%, then only a small amount of the added metal hydroxide may be beneficially employed in order to obtain a still higher proportion of the cis 1,4-addition product. In the case of the preferred type of catalysts such as the aluminum dialkyl halide-titanium trichloride system, the base is employed in amounts up to about 50% by weight of the total catalyst. With less preferred types of catalysts systems, the quantity of the added metal hydroxide that may be beneficially employed is considerably higher and ranges in the order of about 50–100% by weight of the total catalyst. As a generalization, however, it may be stated that in most instances the quantity of the metal hydroxide which will be employed ranges from about 10–40% by weight of the total catalyst. In considering the quantity of the metal hydroxide which is employed one must also consider its relative strength. Thus, where the base is a "strong base" smaller amounts may be required. On the other hand if the base is a "weak base" larger amounts may be necessary. A representative strong base, for example, is sodium hydroxide whereas the weak base is represented by aluminum hydroxide. In a particular preferred embodiment of the invention the metal hydroxide is selected from one having a common ion to the catalyst. Thus for example, if titanium trichloride is employed as one of the catalyst components then the metal hydroxide might advantageously be selected from a titanium hydroxide. In a similar fashion if the catalyst consists essentially of cobaltous chloride then the metal hydroxide may be advantageously selected from cobalt hydroxychloride. In addition the bases mentioned above there may be employed such hydroxides as barium hydroxide, beryllium hydroxide, bismuth hydroxide, cadmium hydroxide, calcium hydroxide, chromium hydroxide, nickel hydroxide, copper hydroxide, iron hydroxide, lead hydroxide, lithium hydroxide, magnesium hydroxide, manganese hydroxide, molybdenum hydroxide, potassium hydroxide, tin hydroxide, zinc hydroxide, and other basic acting compounds such as alkali metal carbonates, biscarbonates, and the like.

The improvements afforded by the present invention will be obtained irrespective of the conjugated diene which is to be polymerized. In the preferred embodiment the present invention is particularly suitable for the polymerization of those conjugated dienes which will be most readily polymerized such as isoprene or butadiene. Other conjugated dienes which may be polymerized to obtain the advantages afforded by this invention include 2,3-dimethyl - 1,3 - butadiene, 2-methyl-3-ethyl-1,3-pentadiene, 2,3-dimethyl-1,3-butadiene, 2-methyl-1,3-pentadiene, 2-methyl-1,3-butadiene, chloroprene, and the like. It will be readily appreciated that the processes of this invention are not limited to the polymerization of a single conjugated diene and if desired two or more conjugated dienes may be copolymerized to obtain the advantages afforded by the present invention.

The base may be incorporated in the reaction system by any suitable means. In the preferred embodiment the metal hydroxide is simply mixed with the other catalyst forming components in an inert solvent whereby the metal hydroxide becomes an integral part of the catalyst. If desired the catalyst may be first prepared in hydrocarbon solvent and thereafter the metal hydroxide is added so that it remains mainly on the surface of the catalyst. Alternatively, the metal hydroxide may be mixed with one of the catalysts components and then the product thus formed is mixed with the remaining catalyst components. In any case, the metal hydroxide is not employed in aqueous solution or suspension although it may be in suspension in an inert hydrocarbon diluent. After the catalyst is prepared and before conducting any polymerization of the conjugated diene on a large scale it will be found to be advantageous to first conduct a polymerization on a very small scale in order to determine the optimum amount of the base to use in conjunction with a particular catalyst selected. This is a particularly advisable procedure because of the several variables which may affect the ultimate result. Once the catalyst system is selected and the optimum amount of the metal hydroxide has been determined the polymerization of the conjugated diene is conducted in the usual manner.

The low pressure polymerization processes for polymerizing conjugated dienes employ temperatures below about 150° C. and pressure below about 500 p.s.i. The polymerizations are conducted normally in the presence of an inert solvent such as isooctane, heptane, benzene, toluene and the like. All that is required is that the catalyst, conjugated diolefin and solvent be brought together in a suitable reactor. The reactor should be equipped with an agitator and inlets for adding more monomer and/or catalyst during the course of reaction. If elevated temperatures are used then the reactor is equipped with suitable heating and cooling means. After the reaction is complete the polymer is worked-up to separate the catalyst residues, which is normally accomplished by washing with a lower alcohol such as methanol. The contents of the reactor are then filtered and the polymer may be additionally washed or treated before it is dried.

The processes of this invention will be described in greater detail in the following examples which are intended for the purposes of illustration only.

*Example I*

A glass ampoule charged with 0.5 gram of anhydrous cobaltous chloride and 3 ml. of dry butadiene is sealed and allowed to stand several hours at 25°. There is obtained a polymer which on shaking with benzene goes into solution. The solution is filtered and the filtrate is added to 100 ml. of methanol whereupon a solid polymer precipitates. The product, by infrared analysis, is identified as 90.5% cis 1,4-polybutadiene, 5.5% trans 1,4-polybutadiene and 4% 1,2-polybutadiene. The polymer has an intrinsic viscosity of 2.0 dl. in toluene at 25° C. The same procedure is repeated except that there is charged additionally 0.25 gram of cobaltous hydroxychloride. After working-up the product is identified as 93% cis 1,4-butadiene, 3% of the trans and 4% of the 1,2-polybutadiene.

*Example II*

The procedures of Example I are repeated using nickelous chloride and nickel hydroxy chloride. The product obtained shows an increase of about 30% in the cis content when the nickel hydroxy chloride is employed.

*Example III*

To a pressure vessel equipped with an agitator and heating coils is added a catalyst prepared from aluminum triethyl and titanium trichloride so that the molar ratio of the titanium to the aluminum is 2.5:1. The catalyst is prepared by merely mixing the aluminum triethyl and the titanium compound in isooctane and heating to 35° C. for several minutes. The temperature is lowered to 25° C. and butadiene is charged to the reactor. The mixture is stirred for one hour. After the polymer is worked-up as in Example I, and upon analysis, the polymer is indicated as being about 80% cis 1,4-polybutdiene, 12% of the trans polymer and 8% of the 1,2. The same procedure is repeated except that 15% of aluminum hydroxide by weight of the total catalyst, is additionally charged to the reactor. The polymer, after working-up contains about 94% of the cis 1,4-polymer and the balance being about equally divided between the trans and 1,2-polymer.

*Example IV*

The procedure of Example III is repeating using a catalyst prepared from aluminum diethyl chloride and titanium trichloride. When the polymerization is conducted in the presence of about 25% of titanium hydroxide, by weight of the total catalyst, there is obtained about 10% more of the cis 1,4-polybutadiene than when the metal hydroxide is not employed.

Example V

In separate experiments the procedures of Example III are repeated using 2% of sodium hydroxide, 20% aluminum hydroxide, 15% of iron hydroxide, and 40% of magnesium hydroxide, 25% bismuth hydroxide and 10% chromium hydroxide, respectively. In all cases it is found that the yield of cis 1,4-addition product is increased over a companion experiment in which the metal hydroxide is not employed.

Example VI

The procedures of Example I are repeated using isoprene in place of the butadiene. In this experiment the increase in the cis 1,4-content is somewhat lower which may be attributed to the specific nature of the catalyst and diene involved.

I claim as my invention:

1. In the process for the polymerization of conjugated dienes at low temperatures and pressure in the presence of a low pressure catalyst, the improvement which comprises conducting the polymerization in the presence of added base selected from the group consisting of a metal hydroxide, alkali metal carbonate and alkali metal bicarbonate, the said catalyst being selected from the group consisting of A through C as follows: (A) the reaction product of (1) a compound of a metal selected from the group consisting of a transition metal of Group IV, V, VI and VIII of the Mendeleeff Periodic Table and manganese with (2) an organo-aluminum compound, (B) the reaction product of a compound as in (A)(1), above, and (2) a reducing agent selected from the group consisting of magnesium alkyl, zinc alkyl and Grignard compound, and (C) a metal halide selected from the group consisting of nickelous chloride and cobaltous chloride.

2. The process of claim 1 in which the catalyst is the reaction product of an aluminum alkyl and a halide of a transition metal selected from the group consisting of groups IV–VI of the periodic table.

3. The process of claim 1 in which the catalyst is the reaction product of aluminum triethyl and titanium trichloride.

4. The process of claim 1 in which the catalyst is the reaction product of aluminum diethyl chloride and titanium chloride.

5. The process of claim 1 in which the catalyst consists essentially of cobaltous chloride.

6. In the process for the polymerization of conjugated dienes at low temperatures and pressure in the presence of a low pressure catalyst, the improvement which comprises conducting the polymerization in the presence of added base selected from the group consisting of a metal hydroxide, alkali metal carbonates and alkali metal bicarbonates, the said catalyst being selected from the group consisting of A through C as follows: (A) the reaction product of (1) a compound of a metal selected from the group consisting of a transition metal of Group IV, V, VI and VIII of the Mendeleeff Periodic Table and manganese with (2) an organo-aluminum compound, (B) the reaction product of a compound as in (A)(1), above, and (2) a reducing agent selected from the group consisting of magnesium alkyl, zinc alkyl and Grignard compound, and (C) a metal halide selected from the group consisting of nickelous chloride and cobaltous chloride.

7. The process of claim 6 in which the catalyst is the reaction product of aluminum triethyl and titanium trichloride.

8. The process of claim 6 in which the catalyst is the reaction product of aluminum diethyl chloride and titanium trichloride.

9. The process of claim 6 in which the catalyst consists essentially of cobaltous chloride.

10. The process of claim 6 in which the diene is butadiene.

11. The process of claim 6 in which the catalyst is the reaction product of an aluminum alkyl and a halide of a transition metal selected from the group consisting of groups IV–VI of the periodic table.

12. The process of claim 11 in which the base is a titanium hydroxide.

References Cited in the file of this patent

UNITED STATES PATENTS 2,820,778  Spaenig _____ Jan. 21, 1958